United States Patent [19]

Nicholson

[11] Patent Number: 4,602,849

[45] Date of Patent: Jul. 29, 1986

[54] METHOD FOR RECORDING HOLOGRAPHIC IMAGES OF HUMAN SUBJECTS

[76] Inventor: Peter Nicholson, 141-17 Cherry Ave., Flushing, N.Y. 11355

[21] Appl. No.: 655,506

[22] Filed: Sep. 27, 1984

Related U.S. Application Data

[62] Division of Ser. No. 327,180, Dec. 3, 1981, Pat. No. 4,474,421.

[51] Int. Cl.[4] ............................................. G03H 1/04
[52] U.S. Cl. .................................... 350/320; 350/3.83
[58] Field of Search ...................... 350/320, 3.84, 3.83

[56] References Cited

U.S. PATENT DOCUMENTS 3,242,341 3/1966 Woodward ........................ 250/221
3,736,040 5/1973 Ziui et al. .

OTHER PUBLICATIONS

Collier, R. J., Burckhardt, C. B., and Lin, L. H. 1971 "Optical Holography" *Academic Press*, New York, Chapter 11, pp. 311–336.

Caufield, H. J. (1979), "Handbook of Optical Holography" Academic Press, New York, Section 10.13, pp. 613–619.

*Code of Federal Regulations*, (1981), Chapter 21, Food and Drugs 21 CFR. §§ 1040.10.

*Primary Examiner*—Bruce Y. Arnold
*Attorney, Agent, or Firm*—Brumbaugh, Graves, Donohue & Raymond

[57] ABSTRACT

A method for recording lifelike images of human subjects comprises the steps of illuminating the subject with a light source of substantially the same color as the wavelength of the laser to thereby simulate the laser for at least a predetermined time period necessary to adapt the subject's eyes to the intensity level of the light source; extinguishing the light source; opening the shutter; and activating a pulse laser, wherein the extinguishing, opening, and activating steps are performed within a time period of approximately 0.5 seconds.

3 Claims, 3 Drawing Figures

METHOD FOR RECORDING HOLOGRAPHIC IMAGES OF HUMAN SUBJECTS

This application is a division of application of Ser. No. 327,180 filed Dec. 3, 1981, now U.S. Pat. No. 4,474,421.

BACKGROUND OF THE INVENTION

1. Technical Field of the Invention

This invention relates to a method for recording holographic images of human subjects safely and in a manner whereby dark eye adaptation of the subject is minimized and to obtain the recording of more lifelike human images.

2. Description of the Prior Art

The recording of images by a holographic process necessarily requires a laser source to generate the object beam and the reference beam. The energy generated by a laser must be of sufficient intensity to record a holographic image on a holographic film plane.

Particularly when the object being recorded is a human subject, the geometries of the object and reference beam paths should be such that any risk that the subject be exposed to laser light be maintained at a minimum. In fact, present laser safety regulations have set the exposure levels based upon what can be safely tolerated by the human eye. (ACGIH (1972), American Conference of Governmental Industrial Hygienists; ANSI (1973), American National Standard for the Safe Use of Lasers).

In holographic applications, the object beam is normally expanded by the use of lenses and then diffused by the use of ground glass screens or the like. If the object beam is not properly expanded or diffused, it may pose a hazard to a human subject. Also, the reference beam, which must be undiffused because it necessarily must have a higher energy level to facilitate recording of a holographic image, also poses a potential threat to human subjects. Various geometries such as an over-head reference beam give partial safety, but do not absolutely safeguard against accidental or deliberate viewing of the reference beam by a human subject.

Another consideration when recording holographic images of human subjects is to obtain the most lifelike reconstruction and clarity of the image. However, at the instant the holographic image is recorded, the room should be generally free of light sources other than the laser light which generates the object beam and the reference beam. When using a pulse laser to record an image, it is generally desirable for the subject to sit in a dark room up until the moment that his image is recorded. However, as is well known, the pupil of the eye varies in diameter in response to the illumination level. Accordingly, the prior art attempts to record holographic images of human subjects under dark room conditions have resulted in reconstructed images whereby the subject's pupils have been unusually large in size which is unlifelike.

Accordingly, it would be desirable to provide an apparatus and method for recording holograohic images in human subjects which is both safe and which results in natural and lifelike images being recorded.

This invention is directed to a method for recording lifelike images in holographic recording materials and more particularly to a method whereby dark eye adaptation of a human subject is minimized. Experiments have shown that the pupil of the human subject varies within the extremes of 2 and 10 mm. When the human subject is subjected to a change of illumination from bright to darkness, the pupil diameter will change from less than 3 mm to over 7 mm over a period of about 100 seconds. Tests have shown that the pupil will commence to respond to darkness after only about 0.5 seconds. (See generally, *Light Color & Vision*, Vyes & Grand, Chapman & Hall, pp. 96-98). Therefore, in order to record a lifelike holographic image of a human subject, when the subject is initially illuminated with natural room light, it is necessary that the recording event take place substantially within a 0.5 second interval after white light illumination of the subject is terminated. It is desirable to maintain the subject in natural room light prior to the recording event so that a holographic operator can choose the subject's expression under the most natural of conditions, i.e., white light. Accordingly, the present invention provides a method of recording a holographic image of a human subject which provides for illuminating the subject in white light up to the time of the recording event, but which also minimizes the possibility of dark eye adaptation of the human pupil.

When the pupil of the subject's eye is dark eye adapted (having a pupil diameter of 7 mm), the maximum permissible safety levels for a Q-switched ruby laser, based on the ACGJH 1972 and ANSI 1973 formula (*Handbook of Optical Holography*, Caulfield, Academic Press (1979), p. 616), is $I_{Rmax}$ 0.07 $J/cm^2$ (which resolves to $I_{Dmax}=0.07$ $J/cm^2$), for the energy density incident upon the diffusing screen. However, for a daylight adapted eye having a diameter of 3 mm, this value can be increased by a factor of 5 to 0.35 $J/cm^2$, since the $I_{Dmax}=0.07$ $J/cm^2$ calculation is based upon a dark adapted pupil with a diameter of 7 mm. This increased energy density on the illumination screen allows for more spot-like illumination effects as opposed to the flat diffused lighting required by the 0.07 $J/cm^2$ level, or on the other hand, if conventional lighting is still used, the safety factor is increased by a factor of 5. Therefore, not only do subjects with daylight adapted eyes appear more lifelike, but in addition, the energy density can be higher and still be within safety levels.

In accordance with the method of the present invention, the holographic recording medium has a shutter and uses a pulse laser which generates an object beam and reference beam. The method of recording comprises the steps of illuminating the subject with a white light source for at least a predetermined time period, extinguishing the white light source, opening the shutter mechanism of the holographic recording medium, activating a pulse laser having an object beam directed towards the subject with the pulse laser positioned so that the object beam light reflected off the subject to be directed towards the recording medium, said laser also providing a reference beam directed towards the recording medium to thereby record holographic image, and closing the shutter mechanism. It is preferred that the steps of extinguishing, opening, and activating occur within the time period of about 0.5 seconds, so that dark eye adaptation of the human subject will be minimized.

By practicing the method of the present invention, the holographic operator will know exactly the expression of the subject's face at the moment of the recording event, i.e., exposure of the holographic recording medium, and the continuous illumination of the subject will prevent dilation of the subject's eye which would otherwise occur due to dark eye adaptation. Also, by providing for the above steps to occur within a time period of substantially 0.5 seconds or less, not only is eye dilation minimized, but subject anxiety is lessened, which will contribute to a more natural and lifelike image being recorded. Also, a red filter can be inserted over the white light source so that the subject is illuminated in the same color light within which his image will be recorded. In this way, the holographic operator will be able to see the subject under the same color light conditions which exist during the actual recording event.

Numerous other advantages and features of the present invention will become readily apparent when the following detailed description of the invention and embodiments thereof, from the claims and from the accompanying drawings.

DETAILED DESCRIPTION OF THE PREFERRED EMBODIMENTS

Figure 1:
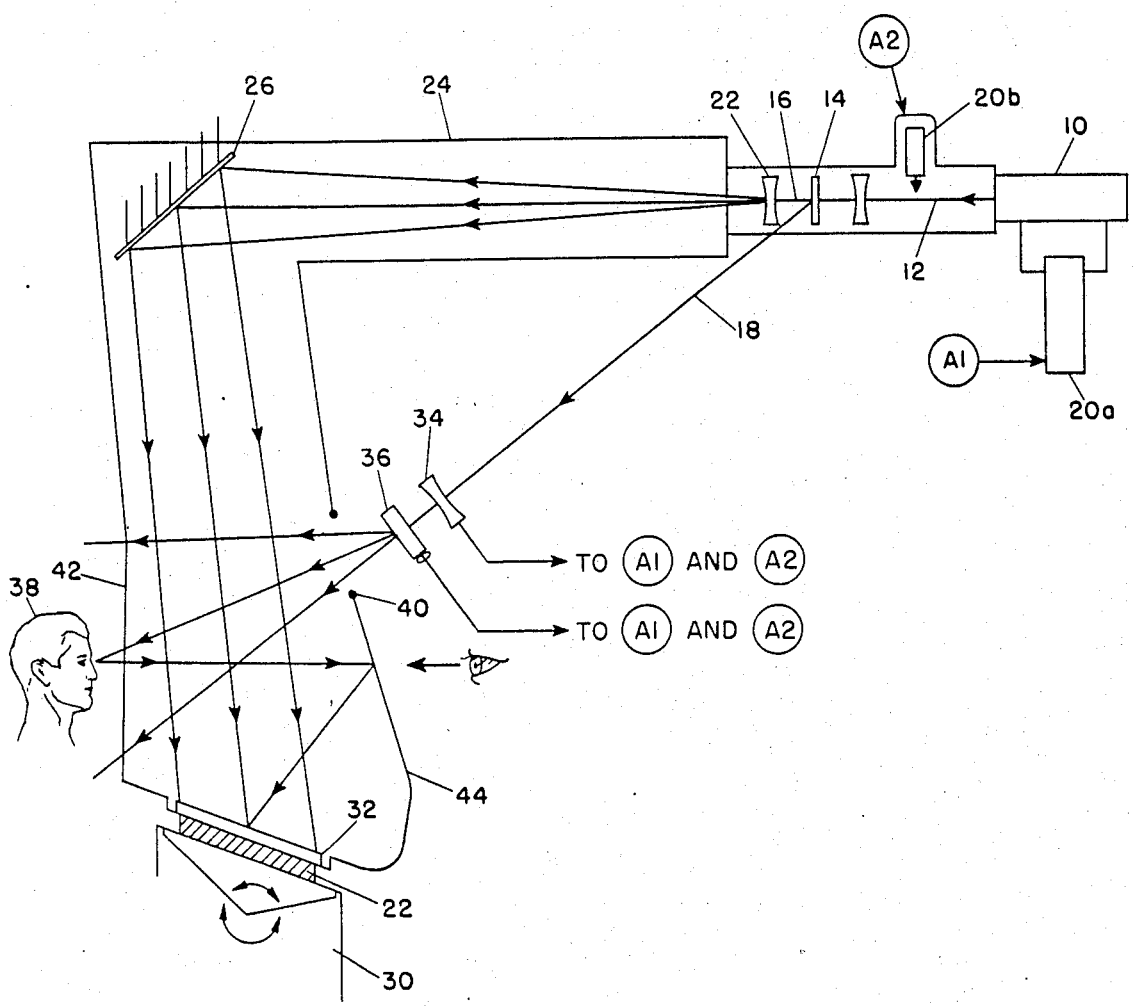
FIG. 1 is a side elevational view of an apparatus for recording a holographic image of a human subject having means for preventing the subject from exposure to the reference beam.

While this invention is susceptible of embodiment in many forms, there is shown in the drawings and will herein be described in detail two specific embodiments, with the understanding that the present disclosure is to be considered as an exemplification of the principles of the invention and is not intended to limit the invention to the embodiments illustrated.

Referring now to FIG. 1, there is shown a laser light source 10 which is preferably a pulse laser. The laser source 10 emits a laser beam 12 which is split by a beam splitter 14 into a reference beam 16 and object beam 18. A safety interlock mechanism 20a is connected in series with the energization circuit of the pulse laser for a purpose to be described below.

The reference beam 16 is expanded through negative lens 22 and passes through the interior region of a housing 24 wherein it is reflected off of a reflective surface 26 downwardly towards a holographic recording material 28. The recording material 28 is held by a holding means or film platen 32 which is pivotally adjustable as indicated to optimize the incidence of reference and object wavefronts to create clear interference fringes in the recording medium 28. The holding means or film platen 30 is covered with a light-proof film shutter 32.

The object beam 18 from beam splitter 14 is directed towards a negative lens 34 which expands the object beam and through ground glass screen 36 which diffuses the object beam so as to minimize the hazard to a human subject 38. The expanded and diffused object beam 18 passes through one side of the protective housing 24 through a window 40 and out of the other side of the protective housing through a clear glass window 42. This object beam light is reflected off a human subject back through the clear glass window 42 and off a specially coated mirror 44 toward the recording material 28 as indicated. The specially coated mirror 44 preferably functions as a two-way mirror so that an operator can view the human subject 38 from the opposite side of the protective housing 24 from the subject. The mirror 44 is preferably coated to totally reflect laser light of the frequency and polarization chosen at a mean angle of 45° incident thereto, while being transparent to white light, thereby creating the two-way effect.

The protective housing 24 along with the clear glass window 42 serves as a safety means for preventing the human subject 38 from exposure to the reference beam 16, since the protective housing substantially encloses the path of the reference beam along at least a substantial portion thereof.

Figure 2A:
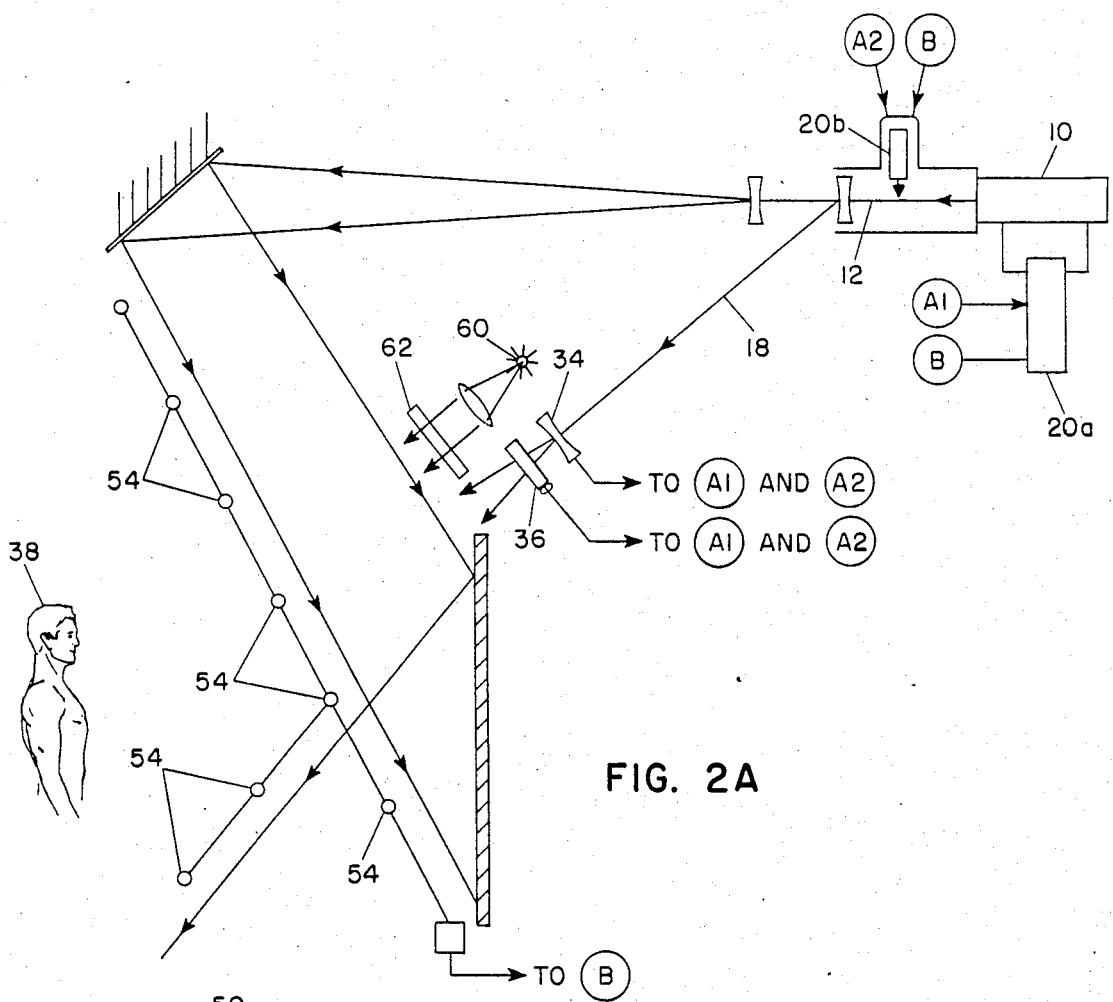
FIG. 2A is a side elevational view of an alternative embodiment to that shown in FIG. 1.
Figure 2B:
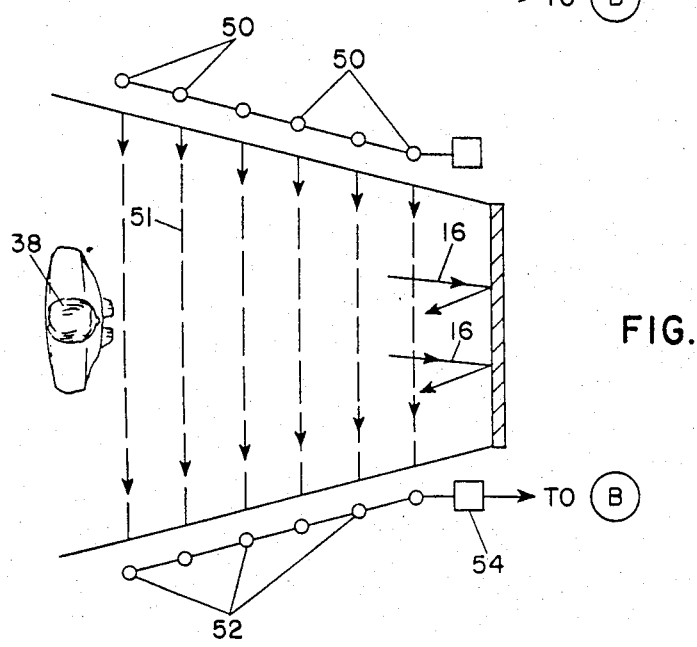
FIG. 2B is top plan view of part of the embodiment of FIG. 2A.

FIGS. 2a and 2b illustrate an alternative embodiment to that shown in FIG. 1. Here the safety means comprises means for detecting the presence of a subject near the path of the reference beam 16, which in turn comprises a plurality of signal generating elements 50 which generate sensing signals preferably in the form of light signals. A plurality of associated signal detector elements 52 are spaced from and positioned to receive the sensing signals so generated, with all of the elements positioned along the periphery of at least a substantial portion of the reference beam path 16. If a human subject 38, or any other object should block the path of a sensing signal 51 from reaching a detector element 52, means 54 associated with the detector elements 52 produces a control signal indicative of a sensing signal being blocked. This control signal is received by a safety interlock mechanism 20 which prevents the laser from being fired in response to a control signal. Alternatively, or in combination, an occluder 20b can be provided which will block the path of the laser light beam 12 by the occluder's release in response to the production of a control signal. Conventional means such as a normally energized solenoid can be used to hold such an occluder 20b above the laser beam 12 so that upon the production of a control signal, or upon a malfunction such as a power loss, the solenoid will automatically de-energize and cause the occluder 20b to drop down into the path of the laser beam 12. A safety interlock mechanism 20a may comprise a switch in series with the circuit which fires the pulse laser, wherein the switch is opened when a control signal is produced.

A second safety means can be used for preventing the human subject 38 from harmful exposure to the object beam 18. Such a second safety means according to the invention comprises means for holding a ground glass screen 36 in the path of the object beam 18 and a means for sensing the presence of such a ground glass screen in the holding means. If the ground glass screen should fail to be present in the holding means, a safety interlock mechanism 20a laser light occluder means 20b similar to that described above for the reference beam can be provided to prevent energization of the laser source and/or block the laser light source in response to the sensing means failing to sense the presence of a ground glass screen.

As can be seen from FIG. 2A, the signal detector elements 54 are arranged in two groups. The elements of the first group in the upper half of FIG. 2A are arranged along a line passing downwardly to the right along the periphery of the path of the reference beam 16. However, since about 8 to 10 percent of the reference beam 16 reflects off the holographic recording material 28, the other elements 54 in the lower half of FIG. 2A are arranged along a line passing downwardly to the left.

The alternative embodiment in FIGS. 2A and 2B shows the holographic recording material 28 disposed vertically and is somewhat larger than that of FIG. 1, in order to make larger scale holograms. However, the embodiment shown in FIG. 1 could just as well make larger scale holograms and the embodiment shown in FIGS. 2A and 2B could just as well make smaller scale holograms.

As shown in FIG. 2A, a white light source 60 is shown near the negative lens 34 and ground glass screen 36 and is used for illuminating the subject prior to the event of recording a holographic image of the subject in accordance with the method of the present invention. As discussed above, the pupil of the human eye responds to changes in intensity level of room light. By using the method according to the present invention, more life-like recordings of human subjects can be obtained by illuminating the human subject in white light substantially up to the time of the recording event.

The method comprises illuminating the subject for at least a predetermined time period so that the human subject's eyes are adapted to the particular intensity level of the white light source. In succession, the white light source is extinguished, the shutter is opened, and the pulse laser is activatd to generate an object beam and a reference beam. The shutter is closed after the holographic image is recorded in the recording medium. After the shutter is closed, the human subject is preferably reilluminated with the white light source.

Since the duration of the pulse of the pulse laser will be on the order of 20 nano-seconds, the above sequence of steps can be performed in rapid succession almost undetectable to the human eye. Accordingly, not only is pupil dilation of the human subject minimized, but anxiety of the human subject is also kept to a minimum with the overall result being the recording of images having a truly lifelike quality. Suitable control mechanisms can be used to control the sequence and timing of illuminating the subject, extinguishing the white light source, opening the shutter, activating the pulse laser, closing the shutter, and reilluminating the human subject.

Also, a red filter 62 can be provided over the white light source so that the subject is illuminated in the same light with which his image will be recorded.

For the foregoing, it will be observed that numerous variations and modifications may be effected without departing from the true spirit and scope of the novel concept of the invention. It is to be understood that no limitation with respect to the specific apparatus or method illustrated and described herein is intended or should be inferred. It is, of course, intended to cover by the appended claims all such modifications as followed in the scope of the claims.

I claim:

1. Method of recording a holographic image of a human subject on a holographic recording material having a shutter, and using a pulse laser which generates an object beam and reference beam of a particular wavelength, comprising the steps of:

illuminating the subject with a light source of substantially the same color as the wavelength of the laser to thereby simulate the laser for at least a predetermined time period necessary to adapt the subject's eyes to the intensity level of the light source;

extinguishing the light source;

opening the shutter;

activating a pulse laser having an object beam directed toward the subject with the pulse laser positioned so that the object beam light reflected off the subject will be directed towards the recording medium, said laser also producing a reference beam directed towards the recording medium to thereby record a holographic image wherein the steps of extinguishing, opening and activating are performed within a time period of approximately 0.5 seconds; and closing the shutter.

2. Method in accordance with claim 1 further including the step of reilluminating the human subject with the light source after the step of closing the shutter.

3. Method in accordance with claim 1 wherein the light source is a white light source having a red filter.

* * * * *